(12) United States Patent
Wood

(10) Patent No.: US 10,499,212 B2
(45) Date of Patent: Dec. 3, 2019

(54) AUGMENTED REALITY IDENTIFICATION OF SUBSCRIBERS

(71) Applicant: Patreon, Inc., San Francisco, CA (US)

(72) Inventor: Timothy Wood, San Francisco, CA (US)

(73) Assignee: Patreon, Inc., San Francisco, CA (US)

(*) Notice: Subject to any disclaimer, the term of this patent is extended or adjusted under 35 U.S.C. 154(b) by 0 days.

(21) Appl. No.: 16/510,129

(22) Filed: Jul. 12, 2019

(65) Prior Publication Data
US 2019/0335302 A1   Oct. 31, 2019

Related U.S. Application Data

(63) Continuation of application No. 15/460,066, filed on Mar. 15, 2017, now Pat. No. 10,356,574.

(51) Int. Cl.
*H04W 4/21* (2018.01)
*H04W 4/021* (2018.01)
*G06Q 30/02* (2012.01)

(52) U.S. Cl.
CPC .......... *H04W 4/21* (2018.02); *G06Q 30/0261* (2013.01); *H04W 4/021* (2013.01)

(58) Field of Classification Search
CPC ....... G06T 19/006; G06T 13/40; G06F 3/011; G06F 3/04815; G06F 8/315; G06F 3/015; G06F 3/013; G06F 16/29; G06F 16/583; G06F 3/04883; G06F 1/163; G06F 3/016; G06F 3/017; G06F 3/0488; G06F 16/957; G06F 21/36; G06F 2221/2111; G06F 3/014; G06F 3/04842; G06F 3/14; G06F 3/1454; G06F 3/147; G06F 3/167; G06F 16/166; G06F 16/27; G06F 16/487; G06F 16/5854; G06F 16/7867; G06F 16/9535; G06F 16/9536; G06F 16/9537; G06F 17/30867; G06F 17/30991; G06F 17/50; G06F 1/28; G06F 21/14; G06F 21/16; G06F 203/011; G06F 2203/04806; G06F 2221/0737; G06F 2221/2103; G06F 2221/2141; G06F 3/00; G06F 3/005; G06F 3/012; G06F 3/04817;
(Continued)

(56) References Cited

U.S. PATENT DOCUMENTS

| 10,356,574 B1 | 7/2019 | Wood | |
|---|---|---|---|
| 2013/0138334 A1* | 5/2013 | Meredith | H04W 4/022 701/408 |

(Continued)

*Primary Examiner* — Christopher M Brandt
*Assistant Examiner* — Jing Gao
(74) *Attorney, Agent, or Firm* — Esplin & Associates, PC

(57) ABSTRACT

Systems and methods are provided for identifying subscribers and/or content creators to each other while attending a real-world/live event. The real-world/live event may be in furtherance of content creation or in furtherance of providing preferential access to subscribers. Identification in the case of subscribers can be based upon subscribership information, commonality of one or more aspects of the subscribers and/or the content creators. For example, a subscriber may be identified with a level of prominence commensurate with the level at which he/she subscribers to a content creator to. Notifications and/or recommendations may be presented in an augmented reality experience along with augmented reality identifications of subscribers and/or content creators.

20 Claims, 8 Drawing Sheets

(58) Field of Classification Search
CPC .... G06F 3/0482; G06F 3/0484; G06F 3/0485; G06F 3/0487; G06F 3/1446; G06F 8/60; H04W 88/02; H04W 64/00; H04L 67/22; H04L 67/306; G06Q 50/01; G06Q 10/101; G06Q 20/0453; G06Q 10/1095; G06Q 20/4014; G06Q 30/0252; G06Q 30/0261; G06Q 30/0267; G06Q 30/0643
See application file for complete search history.

(56) References Cited

U.S. PATENT DOCUMENTS

| | | | |
|---|---|---|---|
| 2013/0226926 A1* | 8/2013 | Beaurepaire | G06K 9/00704 707/740 |
| 2017/0064066 A1* | 3/2017 | Das | H04M 1/72533 |

* cited by examiner

```
┌─────────────────────────────────────────────────────────────────────────┐
│ DETERMINE WHETHER ONE OR MORE ATTENDEES OF A REAL-WORLD EVENT ARE       │
│ PHYSICALLY PROXIMATE TO A CURRENT LOCATION OF A CONTENT CREATOR         │
│ WITHIN THE REAL-WORLD EVENT                                             │
│                                   60                                    │
└─────────────────────────────────────────────────────────────────────────┘
                                    ▼
┌─────────────────────────────────────────────────────────────────────────┐
│ UPON A DETERMINATION THAT THE ONE OR MORE ATTENDEES ARE PROXIMATE       │
│ TO THE CURRENT LOCATION OF THE CONTENT CREATOR, OBTAIN                  │
│ IDENTIFICATION INFORMATION IDENTIFYING THE ONE OR MORE ATTENDEES        │
│                                   62                                    │
└─────────────────────────────────────────────────────────────────────────┘
                                    ▼
┌─────────────────────────────────────────────────────────────────────────┐
│ OBTAIN A DETERMINATION WHETHER THE ONE OR MORE ATTENDEES WHOSE          │
│ IDENTIFICATION INFORMATION HAS BEEN OBTAINED CORRESPONDS TO ONE OR      │
│ MORE SUBSCRIBERS TO THE CONTENT CREATOR, A CORRESPONDENCE               │
│ INDICATING THAT THE ONE OR MORE ATTENDEES ARE SUBSCRIBERS TO THE        │
│ CONTENT CREATOR                                                         │
│                                   64                                    │
└─────────────────────────────────────────────────────────────────────────┘
                                    ▼
┌─────────────────────────────────────────────────────────────────────────┐
│ UPON A DETERMINATION THAT THE ONE OR MORE ATTENDEES ARE                 │
│ SUBSCRIBERS TO THE CONTENT CREATOR, PRESENT AN AUGMENTED REALITY        │
│ REPRESENTATION OF THE REAL-WORLD EVENT TO THE CONTENT CREATOR, THE      │
│ AUGMENTED REALITY REPRESENTATION INCLUDING ONE OR MORE INDICIA          │
│ IDENTIFYING THE ONE OR MORE SUBSCRIBERS TO THE CONTENT CREATOR,         │
│ WHEREIN PROMINENCE OF THE ONE OR MORE INDICIA IS BASED UPON ONE OR      │
│ MORE ASPECTS OF SUBSCRIBERSHIP INFORMATION ASSOCIATED WITH EACH OF      │
│ THE ONE OR MORE SUBSCRIBERS TO THE CONTENT CREATOR                      │
│                                   66                                    │
└─────────────────────────────────────────────────────────────────────────┘
```

FIG. 5

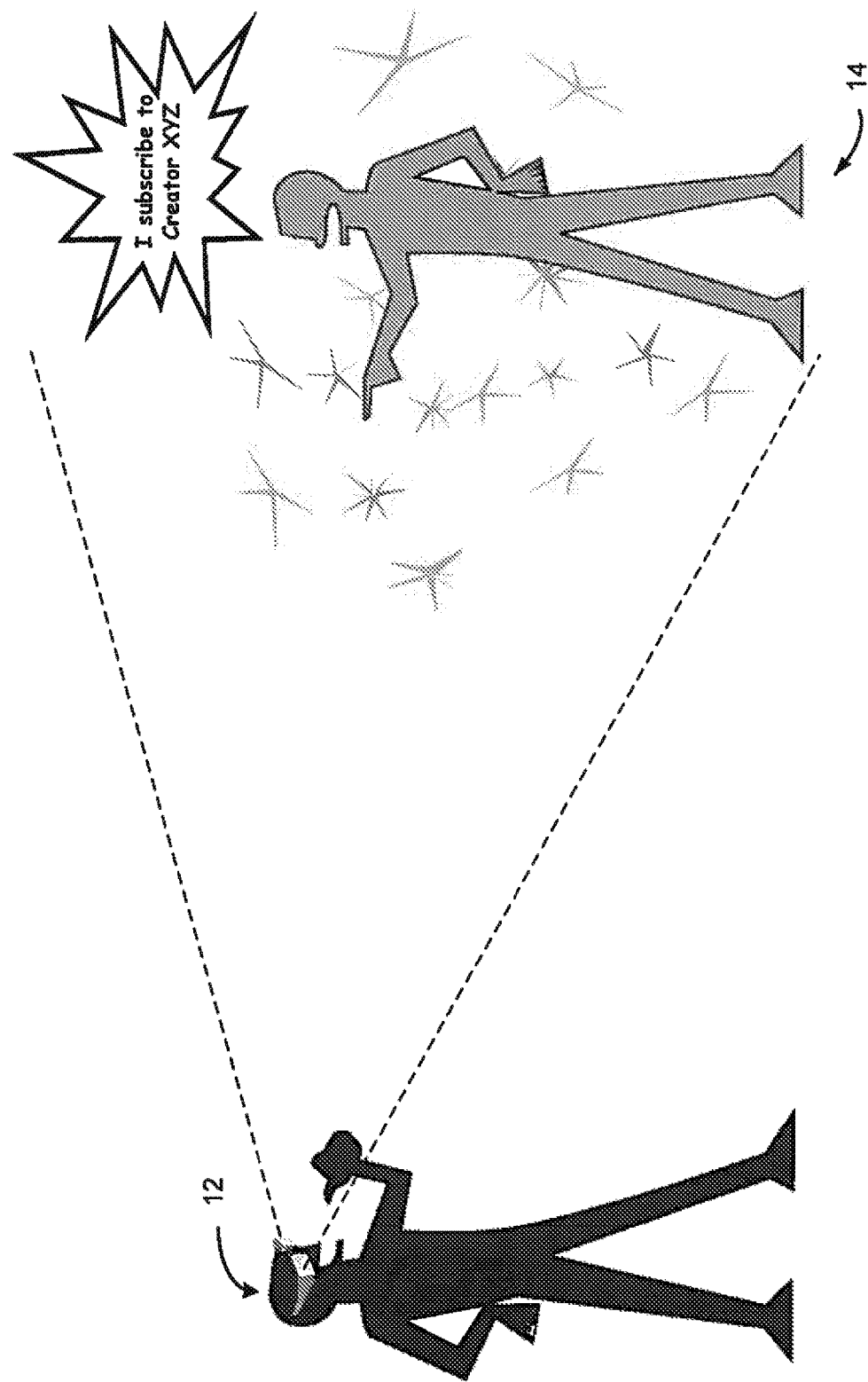

AUGMENTED REALITY IDENTIFICATION OF SUBSCRIBERS

FIELD

The disclosure relates to membership platforms, and in particular, to subscription-based funding. An augmented reality experience may be provided to a content creator and/or to one or more subscribers to the content creator to allow the content creator and/or the one or more subscribers to be identified to each other to enhance subscribership.

BACKGROUND

Different platforms can be utilized by entities seeking contributions from the general public to obtain a needed service(s) and/or resource(s). Some of these platforms facilitate raising resources (i.e., funds) from the general public through monetary contributions or donations to support a project. Oftentimes, supporters of a project are given rewards or special perks, where the size and/or exclusivity of the rewards or special perks can depend on the amount contributed.

SUMMARY

The disclosure describes identifying one or more subscribers and/or content creators to each other when in attendance at a real-world event. The real-world event may be a live event at which content creators perform or create content. The real-world event may be an event at which preferential access may be granted to one or more subscribers to a content creator. Identification of the one or more subscribers and/or the content creators can be based upon subscribership information, commonality of one or more aspects of the subscribers and/or the content creators. For example, regarding subscribers, subscribers may be identified with a level of prominence commensurate with their respective subscription levels to one or more content creators. Notifications and/or recommendations may be presented in an augmented reality experience along with augmented reality identifications of subscribers and/or content creators.

One aspect of the disclosure relates to an augmented reality identification system configured to identify one or more subscribers in an augmented reality representation of a real-world event regarding a content creator to which the one or more subscribers subscribe. The system may comprise one or more physical processors configured by machine-readable instructions to determine whether one or more attendees of the real-world event are physically proximate to a current location of the content creator within the real-world event. The system may comprise one or more physical processors configured by machine-readable instructions to obtain identification information identifying the one or more attendees upon a determination that the one or more attendees are proximate to the current location of the content creator. The system may comprise one or more physical processors configured by machine-readable instructions to obtain a determination whether the one or more attendees whose identification information has been obtained corresponds to the one or more subscribers to the content creator. A correspondence may indicate that the one or more attendees are subscribers to the content creator. The system may comprise one or more physical processors configured by machine-readable instructions to present the augmented reality representation of the real-world event to the content creator upon a determination that the one or more attendees are subscribers to the content creator. The augmented reality representation can include one or more indicia identifying the one or more subscribers to the content creator. Prominence of the one or more indicia may be based upon one or more aspects of the subscribership information.

In order to determine whether one or more attendees of the real-world event are physically proximate to the current location of the content creator within the real-world event, the one or more physical processors are configured by machine-readable instructions to specify a geo-fence surrounding the content creator. In order to specify the geo-fence, the one or more physical processors are configured by machine-readable instructions to determine contextual information associated with a location of the content creator regarding the real-world event. The location may be at least one of a map-based location and a vision-based location.

The determination that the one or more attendees are proximate to the current location of the content creator may be based upon the one or more attendees entering a space within and defined by the geo-fence. The determination regarding whether the one or more attendees whose identification information has been obtained corresponds to the one or more subscribers to the content creator is obtained from a subscription platform through which the one or more subscribers subscribe to the content creator. One or more physical processors of the subscription platform may be configured by machine-readable instructions to compare the identification information identifying the one or more attendees with identification information identifying one or more subscribers to at least one of the content creator and one or more other content creators to determine if a correlation exists therebetween.

The one or more aspects of the subscribership information can comprise at least a subscription level, the one or more physical processors being configured by machine-readable instructions to generate the one or more indicia to be representative of at least the subscription level.

The one or more physical processors may be further configured by machine-readable instructions to present one or more recommendations for increasing subscribership to the content creator with the one or more indicia in the augmented reality representation. The one or more recommendations may comprise a recommendation that the content creator engage in collaborative content creation with at least one other content creator to which the one or more subscribers subscribe.

The one or more physical processors may be further configured by machine-readable instructions to transmit information indicative of the presence of the one or more subscribers to a subscription platform through which the one or more subscribers subscribe to the content creator. One or more processors of the subscription platform can be configured by machine-readable instructions to translate the information indicative of the presence of the one or more subscribers into a virtual medium of exchange redeemable by the one or more subscribers. The virtual medium of exchange may be exchanged in the subscription platform for at least one of preferential access to the content creator and promotional merchandise promoting the content creator.

One aspect of the disclosure relates to an augmented reality identification system configured to identify a subscriber in an augmented reality representation of a real-world event regarding a content creator to which the subscriber subscribes. The system may comprise one or more physical processors configured by machine-readable instructions to obtain identification information identifying a first attendee of the real-world event. The system may comprise one or more physical processors configured by machine-readable instructions to obtain a determination whether the first attendee whose identification information has been obtained corresponds to that of a first subscriber to the content creator. The correspondence may indicate that the first attendee is a subscriber to the content creator. The system may comprise one or more physical processors configured by machine-readable instructions to determine whether the first subscriber is physically proximate to a second subscriber to the content creator upon a determination that the first attendee is a subscriber to the content creator. Upon a determination that the first and second subscribers are proximate to each other, the one or more physical processors configured by machine-readable instructions may present the augmented reality representation of the real-world event to at least the first and second subscribers. The augmented reality representation can include one or more indicia identifying the first and second subscribers as subscribers to the content creator. The one or more indicia can be based upon one or more aspects of subscribership information associated with each of the first and second subscribers. The system may comprise one or more physical processors configured by machine-readable instructions to generate a notification and/or a medium of exchange associated with one or more enhancements to preferential access granted via subscribership to the content creator. The one or more enhancements can result from at least one of the first and second subscribers' attendance of the real-world event.

The determination whether the first attendee whose identification information has been obtained corresponds to that of a first subscriber to the content creator is obtained from a subscription platform through which the first subscriber subscribes to the content creator. One or more physical processors of the subscription platform may be configured by machine-readable instructions to compare the identification information identifying the first attendee with identification information identifying one or more subscribers to at least one of the content creator to determine if a correlation exists therebetween.

To determine whether the first subscriber is physically proximate to the second subscriber, the one or more physical processors can be configured by machine-readable instructions to specify respective geo-fences surrounding at least one of the first subscriber and the second subscriber. To specify the respective geo-fences, the one or more physical processors can be configured by machine-readable instructions to determine contextual information associated with a location of at least one of the first subscriber and the second subscriber. The location may be at least one of a map-based location and a vision-based location.

The determination that the first subscriber is physically proximate to the second subscriber can be based upon the first subscriber entering a space within and defined by the second subscriber's respective geo-fence and/or the second subscriber entering a space within and defined by the first subscriber's respective geo-fence.

The one or more aspects of the subscribership information can comprise at least a subscription level associated with each of the first and second subscribers, wherein the one or more physical processors can be configured by machine-readable instructions to generate the one or more indicia to be representative of at least the respective subscription level associated with each of the first and second subscribers.

The notification may comprise a recommendation that one of the first and/or second subscribers subscribe to another content creator to which the other of the first and/or second subscribers subscribe. The notification may comprise a recommendation that the first and second subscribers engage in a collaborative subscription to the content creator.

The one or more physical processors may be further configured by machine readable instructions to transmit information indicative of the presence of the first and second subscribers to a subscription platform through which the first and second subscribers subscribe to the content creator. One or more processors of the subscription platform can be configured by machine-readable instructions to translate the information indicative of the presence of the first and second subscribers into a virtual medium of exchange. The virtual medium of exchange may be redeemable by each of the first and second subscribers or a combination of the first and second subscribers to be exchanged in the subscription platform for at least one of preferential access to the content creator and promotional merchandise promoting the content creator.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 is an example flow diagram illustrating example processes that may be performed to achieve augmented reality identification of live event attendees.

FIGS. 7A and 7B illustrate example augmented reality identification scenarios in accordance with various embodiments.

DETAILED DESCRIPTION

Figure 1:
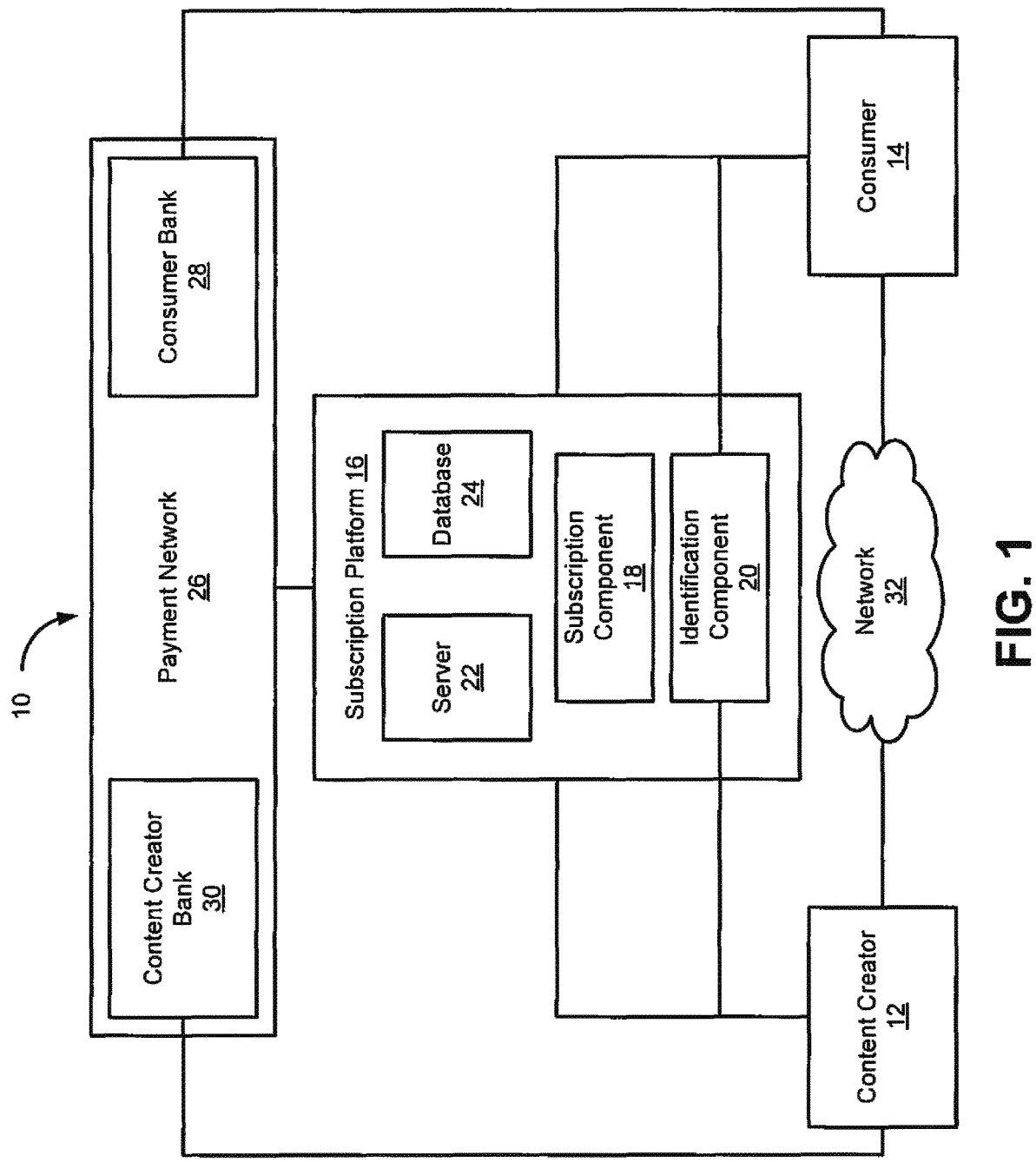
FIG. 1 illustrates an example membership system.

Some entities may seek to fund their business through subscriptions. Such entities may utilize online membership platforms that allow consumers to sign up for ongoing payments in exchange for rewards or other membership benefits.

Some entities seeking funding may be content creators, for example, artists, musicians, educators, etc. Content creators may create content, which can refer to any type of information, experience, or product provided to an audience or end-user, whether it be digital, analog, or virtual. For example, content may include but is not limited to video content, podcasts, photographic art, webcomics, do-it-yourself crafts, digital music, performance art, and other types of content. Content creators may utilize membership platforms that allow consumers to become subscribers of the content creator. As subscribers, consumers may contribute or donate money to a content creator on a recurring (e.g., weekly or monthly) basis or per piece of content created by the content creator. Content creators may interact with subscribers and/or prospective subscribers (e.g., consumers that show interest in the content created by content creators) in a variety of ways. It should be noted that although the disclosure may describe embodiments in the context of a subscriber-based membership platform such as a recurring content website, the augmented reality identification of subscribers and/or content creators may be accomplished irrespective of how content may be distributed and/or any particular membership platform utilized by the content creator.

In the context, for example, of providing content, increasing prominence, subscribership and/or revenue, rewarding subscribers, etc. content creators may organize and/or participate in a live event. A content creator that creates musical content may perform at a live concert. A content creator that is an artist may show his/her artwork at a live art exhibit or show. A content creator wishing to reward one or more subscribers with preferential access may make an appearance at a live event or initiate a meeting to mingle with subscribers, network with other content creators, and the like. There are many scenarios in which a content creator may wish to engage in a live event.

Identification of subscribers and/or content creator at such live events can be accomplished using augmented reality identification. For example, a content creator may wish to determine which audience members, attendees, or participants of a live event subscribe to that content creator. In this way, and by utilizing an augmented reality device or mechanism, a content creator may easily identify his/her subscribers so that he/she may engage those subscribers in a preferential access activity. For example, subscribers may wish to advertise or otherwise "show off" their status as a subscriber or a subscriber at a particular subscription level.

Augmented reality systems and methods can be utilized to identify content creators and/or content characteristics, as well as subscribers and/or subscribership characteristics with, e.g., specialized augmented reality graphics or elements. Such augmented reality identification mechanisms may be used to prompt or generate notifications regarding suggested subscriptions, subscription levels, and/or collaborative engagements amongst content creators and/or subscribers. Utilizing augmented reality identification can facilitate interactions and/or other activities involving content creators and/or subscribers.

FIG. 1 illustrates an example subscriber-based membership system 10. A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation information, content information, information specifying desired and/or initial subscription levels, and/or preferred revenue source information which will be discussed in greater detail below. The page created by content creator 12 may be built using such information to make potential consumers aware of how content creator 12 may wish to be supported/receive support for his/her content creation in addition to subscribership revenue. Content creator 12 may set up a content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 may set up a subscriber account with subscription platform 16. In setting up the subscriber account, consumer 14 may input demographic information relevant to consumer 14, e.g., age, income, job, etc. Information identifying consumer 14, such as name, a picture, a phone number, etc. may be input by consumer 14 when setting up the subscriber account. Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and transfer the pledged amount from consumer bank 28 to content creator bank 30. Alternatively (or in addition to per content pledge donations), consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of, e.g., special perks or rewards. Content creator 12 can specify tiers of preferential access based upon the amount of money consumer 14 pledges to donate and/or depending on whether the pledged donation is a recurring donation or a per content donation. The amounts and/or types of pledged donations that can be made by consumer 14 to back content creator 12 can be referred to as subscription levels.

For example, in return for a monthly, recurring ten dollar donation, content creator 12 may provide a high-resolution digital image of the artwork created during that month to consumer 14. In exchange for a weekly, recurring ten dollar donation, content creator 12 may provide a high-resolution digital image of the artwork created during that month as well as a time-lapse video of content creator 12 creating the artwork. In exchange for a five dollar per content donation, content creator 12 may provide a low-resolution digital image of the artwork. For a one hundred dollar per content donation, content creator 12 may engage in a live webchat or live meet-and-greet with consumer 14. Various types of preferential access can be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., WiFi) a mobile communication network, a satellite network, the Internet, fiber optic, coaxial cable, infrared, radio frequency (RF) or any other suitable network. The preferential access may be provided to consumer 14 from content creator 12 via subscriber platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access, as well as his/her preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in any type of suitable database configuration, such as a relational database, a structured query language (SQL) database, a distributed database, an object database, etc. Suitable configurations and database storage types will be apparent to persons having skill in the relevant art.

Content creator 12 may add subscribership information, update and/or delete existing subscribership information, add creation information, as well as update and/or delete creation information, add, update, and/or delete preferential access information and/or its correspondence to subscription levels, etc. Such changes can be input via subscription component 18 and reflected in its local memory and/or database 24. It should be understood that content creator 12 and/or consumer 14 may be an individual or some entity representative of an individual or group of individuals.

Apart from providing preferential access to consumer 14, content creator may engage with consumer 14 by interacting in a variety of ways. For example, content creator 12 may communicate with consumer 14 over email, one or more social media platforms, a messaging platform or other appropriate communication mechanism or method. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's webpage may be provided on the webpage allowing content creator 12 to share content creation progress updates with consumer 14. For example, content creator 12 may respond to a communication from consumer 14 posted on a comment section provided on content creator 12's webpage in a private message or as part of the comment thread. It should be noted that content creator 12 may engage a single consumer, e.g., consumer 14, one-on-one and/or may engage a group of consumers. For example, content creator 12 may post a "public" comment on his/her webpage that can be seen by any consumer that is a subscriber to content creator 12 and/or any consumer that may be a potential subscriber. It should be noted that a content creator's subscribers can be collectively referred to as the content creator's community.

Identification component 20, as will be subsequently described in greater detail, can determine one or more appropriate ways in which to identify a subscriber and/or content creator associated with a live event.

Figure 2:
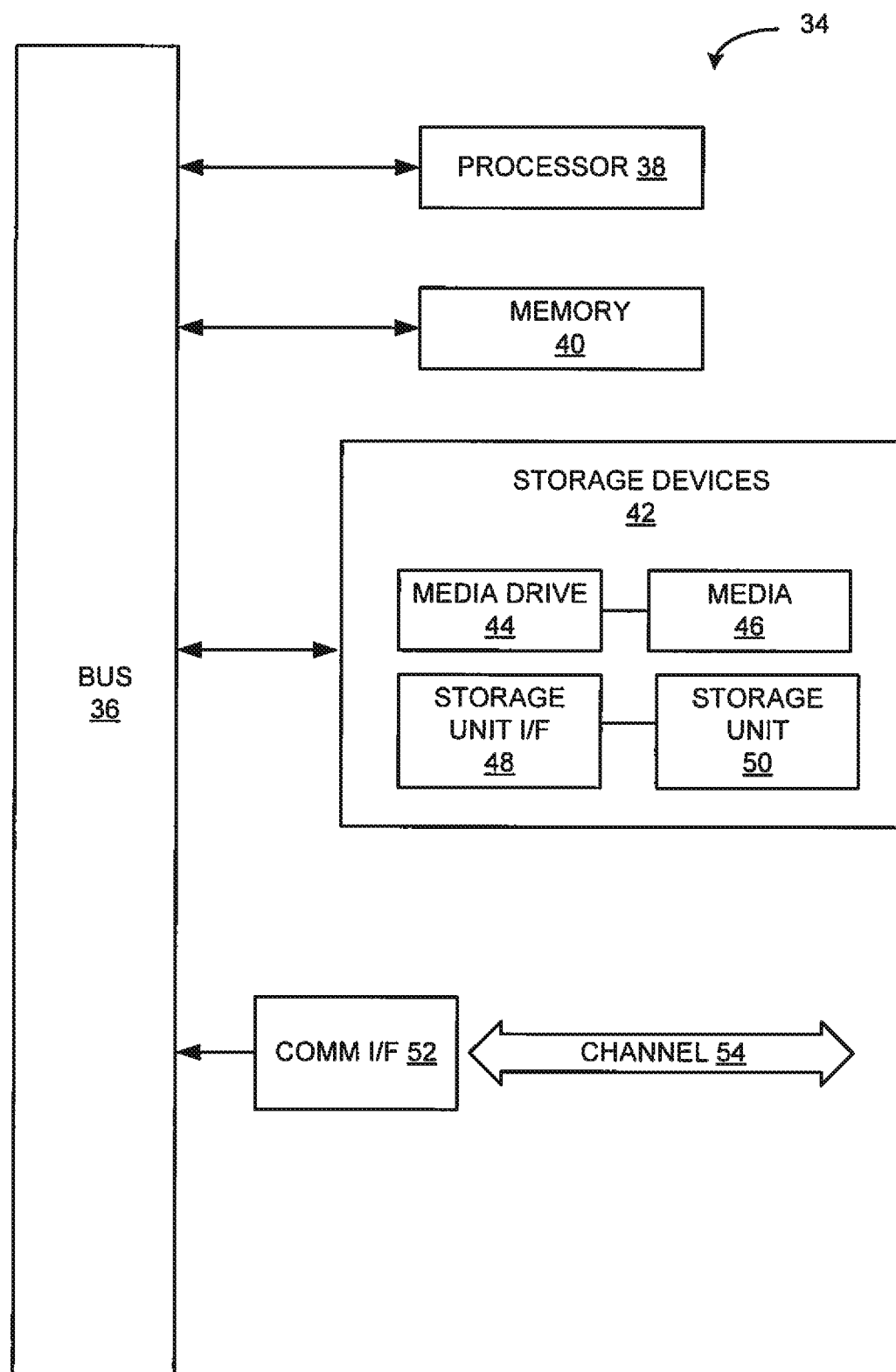
FIG. 2 is an example computing component that may be used to implement various features described in the disclosure.

FIG. 2 illustrates an example computing component that may be used to implement various features of the system and methods disclosed herein, for example, subscription platform 16, server 22, subscription component 18, payment network 26, recommendation component 20, and/or one or more elements comprising these components.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this disclosure, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components are implemented in whole or in part using software, in one embodiment, these software elements can be implemented to operate with a computing or processing component capable of carrying out the functionality described with respect thereto. One such example computing component is shown in FIG. 2. Various embodiments may be described in terms of this example computing component 34. After reading this disclosure, it will become apparent to a person skilled in the relevant art how to implement the application using other computing components or architectures.

Computing component 34 may represent, for example, computing or processing capabilities found within a desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 34 might also represent computing capabilities embedded within or otherwise available to a given device. For example, a computing component might be found in other electronic devices such as, for example, portable computing devices, and other electronic devices that might include some form of processing capability.

Computing component 34 might include, for example, one or more processors, controllers, control components, or other processing devices, such as a processor 38. Processor 38 might be implemented using a general-purpose or special-purpose processing engine such as, for example, a microprocessor, controller, or other control logic. In the illustrated example, processor 38 is connected to a bus 36, although any communication medium can be used to facilitate interaction with other components of computing component 34 or to communicate externally.

Computing component 34 might include one or more memory components, simply referred to herein as memory 40. For example, preferably random access memory (RAM) or other dynamic memory, might be used for storing information and instructions to be executed by processor 38. Memory 40 might be used for storing temporary variables or other intermediate information during execution of instructions, such as machine-readable instructions, to be executed by processor 38. Computing component 32 might include a read only memory ("ROM") or other static storage device coupled to bus 36 for storing static information and instructions for processor 38.

The computing component 34 might include one or more various forms of information storage mechanisms 42, which might include, for example, a media drive 44. The media drive 44 might include a drive or other mechanism to support fixed or removable storage media 46. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 46 might include, for example, a hard disk, an integrated circuit assembly, magnetic tape, cartridge, optical disk, a CD or DVD, or other fixed or removable medium that is read by, written to or accessed by media drive 44. As these examples illustrate, the storage media 46 can include a computer usable storage medium having stored therein computer software or data.

Computing component 34 might include other similar instrumentalities for allowing computer programs or other instructions or data to be loaded into computing component 34. Such instrumentalities might include, for example, a fixed or removable storage unit 50 and an interface 48. Examples of such storage units 50 and interfaces 48 can include a program cartridge and cartridge interface, a removable memory (for example, a flash memory or other removable memory component) and memory slot, a PCMCIA slot and card, and other fixed or removable storage units 50 and interfaces 48 that allow software and data to be transferred from the storage unit 50 to computing component 34.

Computing component 34 might include a communications interface 52. Communications interface 52 might be used to allow software and data to be transferred between computing component 34 and external devices. Examples of communications interface 52 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 52 might typically be carried on signals, which can be electronic, electromagnetic (which includes optical) or other signals capable of being exchanged by a given communications interface 52.

These signals might be provided to communications interface 52 via a channel 54. This channel 54 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 40, storage unit 50, media 46, and channel 54. These and other various forms of computer program media or computer usable media may be involved in carrying one or more sequences of one or more instructions to a processing device for execution. Such instructions embodied on the medium, are generally referred to as "machine-readable code," "computer program code" or a "computer program product" (which may be grouped in the form of computer programs or other groupings). When executed, such instructions might enable the computing component 34 to perform features or functions of the disclosure as discussed herein.

Figure 3:
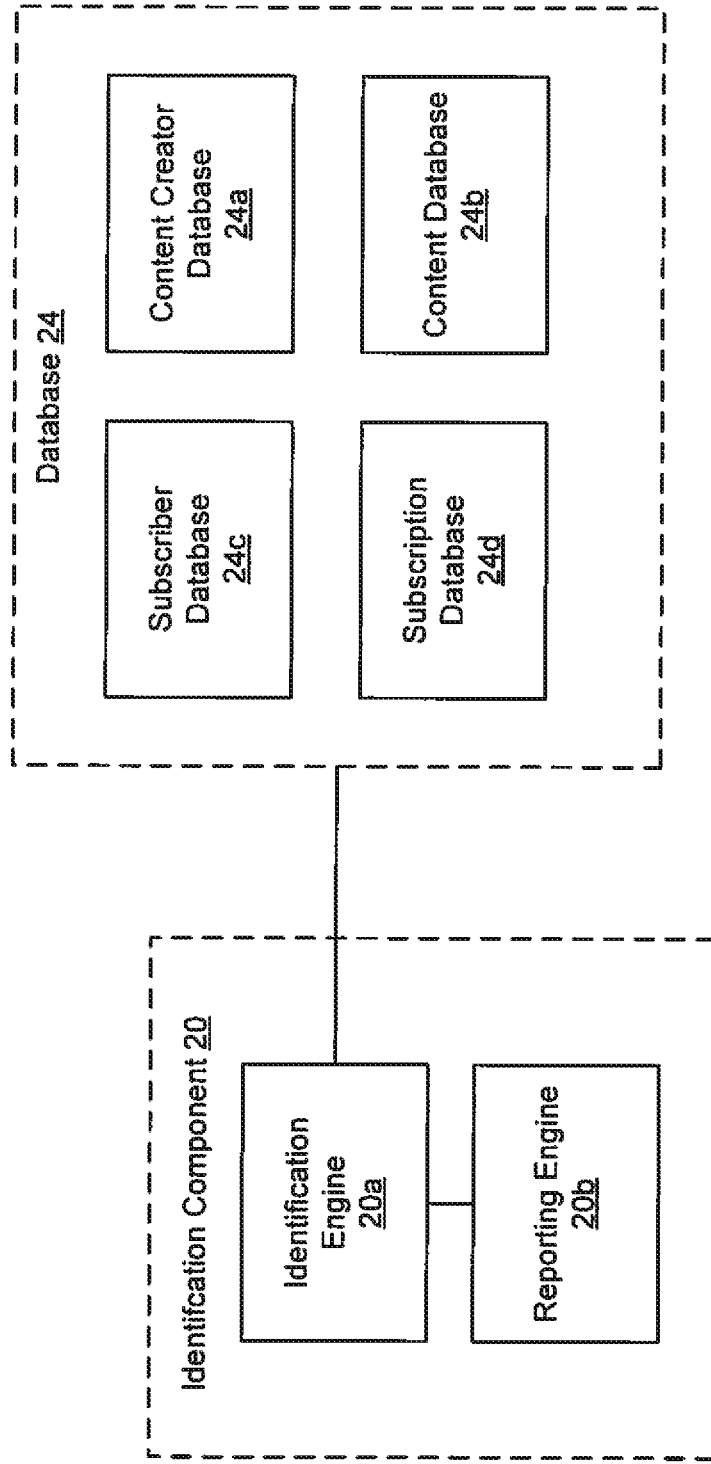
FIG. 3 illustrates an example identification system.

FIG. 3 illustrates elements that may make up identification component 20 and database 24. As indicated previously, subscription component 18 may transmit information input by content creator 12 and/or consumer 14 regarding creation and/or subscribership information to database 24. Subscription platform 16, via server 22, for example, may monitor and obtain creation and/or subscribership information for storage in database 24. For example, subscription platform 16 may monitor and store additional content creator and/or subscriber demographic information as well as performance-related subscribership information, e.g., engagement activity between content creator 12 and his/her subscribers, one of whom may be consumer 14. For example, subscription platform 16 may monitor the amount of money being generated and/or lost through the subscribers, as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with creation data and/or subscription level information monitored or obtained from and/or associated with existing content creator and/or subscriber accounts established in subscription platform 16. Creation data can refer to information that characterizes one or more of content creator 12, the content that content creator 12 creates, and activity engaged in by content creator 12 to interact with one or more subscribers and/or to which consumer 14 is granted preferential access.

Content creator information characterizing content creator 12 can be information reflecting the type of creator that content creator 12 designates him/herself to be and/or any preferences regarding subscription offerings by content creator 12. For example, content creator type information can reflect that content creator 12 may be a paint artist, a digital artist, a sculptor, a video game developer, a writer, a performance artist, etc. Content creator preference information can reflect subscription levels content creator 12 wishes to offer to subscribers. Content creator preference information can reflect, e.g., a desired minimum revenue, preferred sources of revenue, subscription level proportions, etc. For example, content creator preference information may include information indicating content creator 12's desire for more subscribers pledging some amount of money or less subscribers pledging a greater amount of money. For example, content creator preference information may include information specifying that content creator 12 wishes to supplement his/her subscription-generated revenue with revenue generated from the sale of promotional merchandise. Such information may be stored in a content creator database 24a.

In addition to content creation-related information, and upon registering with subscription platform 16 as a content creator, content creator 12 may input information characterizing the identity of content creator 12. For example, content creator 12 may input or upload contact information, a telephone number associated with a personal user device, such as smartphone, an email address, a photograph, and/or other identifying information. Such identifying information can be used by subscription platform 16 in a variety of ways to associate content creator 12 with particular content, his/her webpage, payment of subscription donations, etc. For example, content creator 12's photograph may be used, e.g., as an avatar on content creators webpage, and/or as a mechanism for correlating content creator 12's attendance at a live event with content creator 12's status as a content creator. Subscriber component 18 or another component may be used to provide a user interface that can be used by content creator to input such information.

Content information characterizing the content that content creator 12 creates can refer to one or more of the type of content created, the medium in which the content is created and/or presented, the amount of content created, and/or the frequency at which the content is created. For example, type of content information and/or content medium information may indicate that content creator 12 creates paintings on canvas, develops video games for a mobile platform, performs in online musical performances, etc. For example, content amount information can reflect that content creator 12 created a series of artwork comprising four paintings. For example, content frequency information can indicate that content creator 12 developed three video games over the course of six months. Such information may be stored in content database 24b.

As previously discussed, consumer 14 may subscribe to content creator 12 by registering with subscription platform 16. During registration, consumer 14 may input certain subscriber demographic information indicative of economic and/or social characteristics of consumer 14. Subscriber demographic information may reflect the yearly income of consumer 14, a geographic area in which consumer 14 resides, the age of consumer 14, interests of consumer 14, etc. Subscriber information can include data regarding the amount of money consumer 14 is currently pledged to donate to one or more content creators. Over time, as monitored and collected by subscription platform 16, subscriber information can include information regarding the amount of money consumer 14 has previously donated to one or more content creators, including content creator 12. Subscriber information, as monitored and obtained by subscription platform 16 may include an Internet Protocol (IP) address indicative of a current location of consumer 14 and/or an IP address indicating a payment source. Such information may be stored in subscriber database 24c.

Like content creator 12, consumer 14 may input or upload other identifying information that can be used by subscription platform 16 in a variety of ways to associate consumer 14 with particular content, a particular content creator, payment of subscription donations, etc. For example, a photograph or phone number of consumer 14 may be used, e.g., as a mechanism for correlating consumer 14's attendance at a live event with consumer 14's status as a subscriber of content creator 12, another content creator present at the live event, a subscriber of content similar to that being presented at the live event, etc. Such information may be stored in subscriber database 24c. Subscriber component 18 or another component may be used to provide a user interface that can be used by consumer 14 to input such information.

Subscription level information can refer to information characterizing different subscription levels and corresponding preferential access information specified by content creator 12. For example, subscription level information can reflect that a ten dollar recurring donation is rewarded with a high-resolution digital image of artwork created during that month to consumer 14. Such subscriber level information may be stored in subscription database 24d.

It should be noted that other databases or partitions may make up database 24. For example, database 24 may include one or more databases or partitions for storing information including, but not limited to the following: preferential access information characterizing activity in which content creator 12 engages can refer to data reflecting the type of activity, the level and/or exclusivity of preferential access to that activity granted to consumer 14; subscriber and/or content creator engagement information characterizing interactions, the type and/or frequency of interactions between subscribers and content creators, and/or the medium over which interactions can occur; and historical subscription level and/or engagement information reflecting subscription level and/or engagement information monitored and gathered over one or more periods of time. Examples of such information and databases are described in copending U.S. application Ser. No. 15/432,788 and/or U.S. application Ser. No. 15/432,828.

It should be noted that not all the information described above is necessarily required. It should be noted that information reflecting additional aspects of, e.g., the content, content creator, content creator preferences, and/or subscribership is contemplated by the disclosure. For example, content creator 12 need not initially specify his/her content creator preferences, and instead rely solely on recommendation component 20 to provide subscription recommendations specifying the amount and/or frequency of content creation. For example, preferential access need not necessarily be offered for each subscription level. For example, subscriber data may include data reflecting particular content creators to which a subscriber pledges donations.

FIG. 3 illustrates that identification component 20 may comprise an identification engine 20a for determining the identity of subscribers and/or content creators, as well as an appropriate manner in which subscribers and/or content creators may be identified in an augmented reality experience. Identification component 20 may comprise a reporting engine 20b for reporting or otherwise forwarding identification information to an augmented reality device.

Identification component 20 may obtain and/or analyze information associated with one or more content creators and/or subscribers, and determine an appropriate manner of identifying such content creators and/or subscribers in attendance at a live event. For example, the identity of a live event attendee can be correlated to that of a subscriber and/or a content creator present at the live event (or somehow relevant to the live event (e.g., a subscriber subscribes to a content creator that creates content similar to or the same as another content creator present at the live event). For example, a content creator at the live event can approach a subscriber that subscribes to a content creator with similar content to attempt to gain that subscriber as a new subscriber. Through reporting engine 20b, identification component 20 may transmit identification information to an augmented reality device or have identification information obtained therefrom by the augmented reality device to effectuate a desired augmented reality identification.

Figure 4:
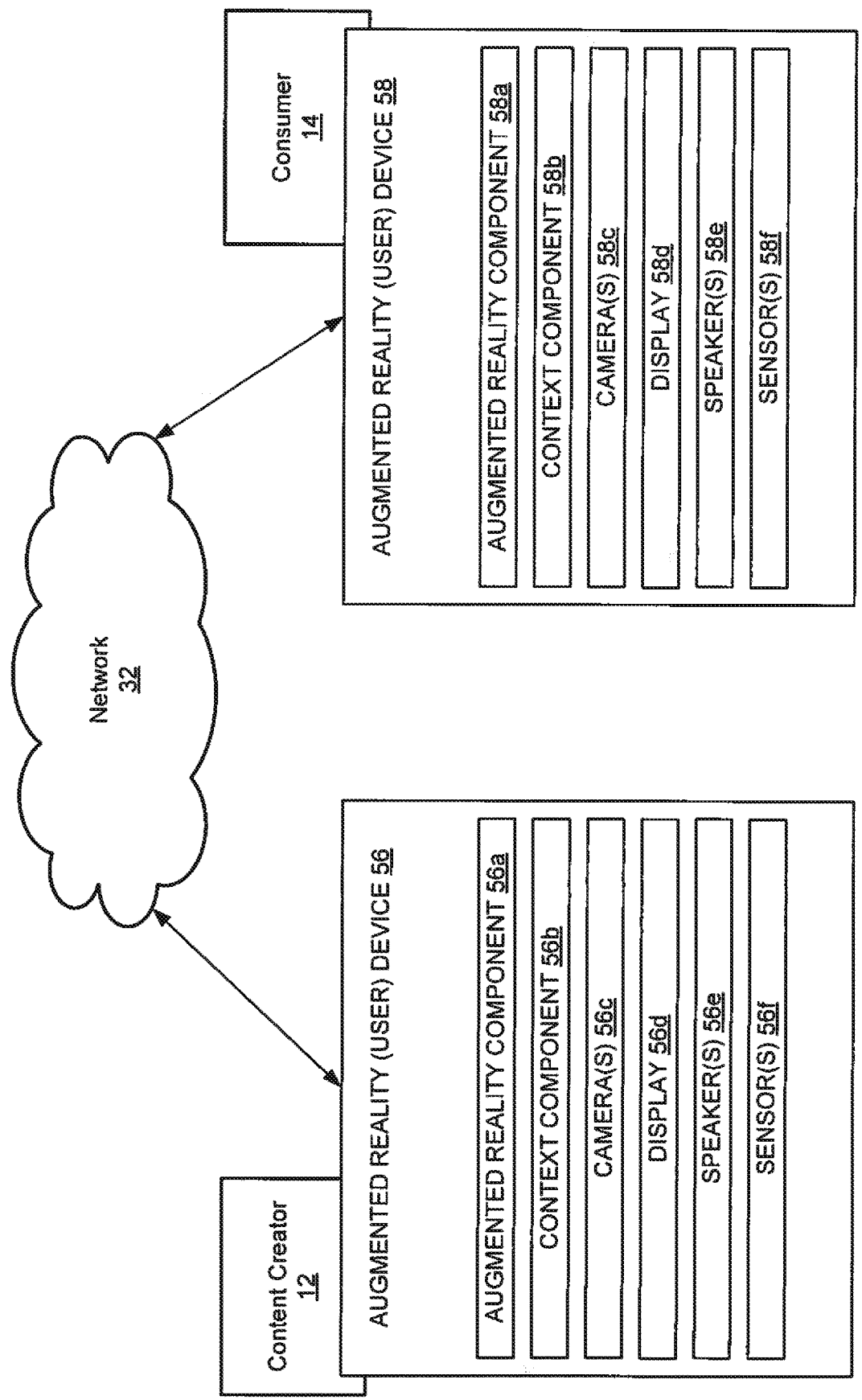
FIG. 4 illustrates example augmented reality devices that are interoperable with the example identification system of FIG. 3.

FIG. 4 illustrates example augmented reality devices 56 and 58 through which attendees of a live event may be identified in an augmented reality experience. In the example illustrated in FIG. 4, augmented reality device 56 may be implemented as solely an augmented reality device or as part of a user device (such as a smartphone, tablet PC, etc.) operated by an attendee, e.g., content creator 12. Augmented reality device 58 may be implemented as solely an augmented reality device or as part of a user device (such as a smartphone, a head mounted display, etc.) being utilized by consumer 14.

Augmented reality device 56 may include an augmented reality component 56a, a context component 56b, one or more cameras 56c, a display device 56d, one or more optional speakers 56e, and one or more optional sensors 56f. Similarly, augmented reality device 58 may include an augmented reality component 58a, a context component 58b, one or more cameras 58c, a display device 58d, one or more optional speakers 58e, and one or more optional sensors 58f. As used herein, an augmented reality device refers to any device capable of displaying a real-time view of a physical, real-world environment while altering elements within the displayed view of the environment. In contrast to a virtual reality device which displays a view of a virtual world, an augmented reality device displays a view of the real world but augments (e.g., adds or modifies) elements using computer graphics technology. Such an augmented reality device may include and/or be communicatively coupled to one or more cameras used to capture a view of the real-world environment and may further include computer software and/or hardware configured to augment elements of the captured scene. For example, as will be described in greater detail below, subscribers and/or content creators may be identified with augmented reality identifiers, e.g., textual and/or graphical components displayed proximate to their person in an augmented reality experience. When a user looks at or through the augmented reality device, the user sees an augmented view of the physical real-world environment in which the user is located, e.g., the aforementioned augmented reality identifiers and the content creator(s) and/or subscriber(s) with which the augmented reality identifiers may be associated.

The one or more cameras 56c may include cameras for capturing a visual scene. As used herein, a visual scene refers to a view(s) of the real-world environment in which the augmented reality device 56 is being used. For instance, a visual scene may be a series of images of a real-world environment. In examples illustrated in FIGS. 7A and 7B, the visual scene captured by augmented reality device 56 or augmented reality device 58 may include one or more attendees of a live event.

One or more sensor(s) 56f may include an accelerometer and/or gyrometer capable of measuring physical acceleration and/or angular positioning of the augmented reality device 56. Augmented reality component 56a may use the accelerometer and/or gyrometer to determine when the position of the augmented reality device 56 is changing, for example, which could indicate that the position of the augmented reality device 56 relative to its real-world surroundings or elements therein may be changing.

Context component 56b may be configured to obtain contextual information from real-time measurements/information to determine a real-world context in which augmented reality identification may be utilized. Contextual information may be obtained, e.g., from one or more of sensor(s) 56f. For example, location information may be map-based, e.g., obtained from location sensors, such as global positioning system (GPS) receivers, from triangulation information received from one or more communication components which may comprise augmented reality device 56, and/or one or more location service providers that provide location information and may be communicatively connected to augmented reality device 56. For example, audio information may be obtained from microphones.

Context component 56f may obtain contextual information that can be vision-based such as that including, but not limited to the aforementioned location information based on image recognition of image features such as buildings, structures, facial recognition of participants at a live event, and/or other identifiable objects taken from a view of the real-world environment. Identifiable objects may include objects having a code or other indicator capable of being sensed visually and/or by one or more sensor(s) 56f.

Context component 56b may be configured to obtain contextual information that describes the context of a view of a physical space, such as a venue in which a live event may be taking place. The view of the physical space may include an image being displayed in real-time through one or more camera(s) 56c (e.g., through a display, such as display 56d that displays a scene being captured by imaging sensors of a camera), an image that is stored and displayed (e.g., a photograph), and/or other views of a physical space. Contextual information that describes the context of the view of the physical space may include a geo-location of the physical space (e.g., a current location for real-time implementations and a location at which the view was taken for stored implementations), and/or a geo-fence about the physical space and/or an attendee of a live event, and/or other contextual information.

Operation of augmented reality device 58 may be the same or similar to that described above regarding the operation of augmented reality device 58.

Knowledge of location and/or a physical space can be used to determine the proximity of one or subscribers to a content creator and/or other subscriber(s), attendance of a subscriber or content creator at a live event, etc. It should be noted that while FIG. 4 illustrates augmented reality device 56 as being associated with content creator 12, and augmented reality device 58 as being associated with consumer 14, augmented reality devices 56 and 58 may be associated with two consumers/subscribers or two content creators. In some scenarios, a content creator, e.g., content creator 12 may utilize an augmented reality device, e.g., augmented reality device 56 to engage in an augmented reality experience of a live event in which consumer 14 is identified as being a subscriber to content creator 12. Consumer 14 may be identified by recognition of a beacon or other identifying transmission from augmented reality device 58 or a user device in which augmented reality device 58 is implemented. Consumer 14 may be identified via an object having a QR code identifying consumer 14 as a subscriber to content creator 12, and consumer 14 need not be using or be associated with augmented reality device 58. Consumer 14 may be identified through facial recognition, negating a need for any identifying object or augmented reality device to be used or in consumer 14's possession at the time of identification.

One or more of augmented reality devices 56 and 58 may communicate with network 32 to obtain identification information from identification component 20 (FIG. 3). In operation, and referring to FIG. 5, an augmented reality device may determine whether one or more attendees of a real-world event are physically proximate to a current location of a content creator within the real-world event. For example, based on knowledge of location of content creator 12 in attendance at a real-world event, augmented reality device 56 may specify a geo-fence about content creator 12. For example, augmented reality device 56 may specify a geo-fence having a particular radius or other spatial distance. The geo-fence may be specified using map-based contextual information regarding knowledge of, e.g., a location of content creator 12 determined from one or more sensors 56f such as a GPS receiver. The geo-fence may be specified using visual-based contextual information regarding knowledge of the content creator 12's location within a particular physical space, such as a building in which the real-world event is taking place, one or more cameras 56c determining the existence of one or more walls bounding the building.

When another attendee of the real-world event enters the geo-fence about content creator 12, such as consumer 14, augmented reality device 56 may attempt to ascertain the identity of consumer 14, i.e., at operation 62, upon a determination that the one or more attendees are proximate to the current location of the content creator, identification information identifying the one or more attendees is obtained. For example, augmented reality device 56 of content creator 12 may sense that consumer 14 enters the geo-fence by comparing contextual information prior to entry of consumer 14 (indicating an absence of a person within the geo-fence) and that subsequent to entry of consumer 14 (indicating the presence of a person within the geo-fence). For example, augmented reality device 56 may sense a beacon or a QR code or other identifying indicia associated with consumer 14 and/or a user device of consumer 14, e.g., augmented reality device 58, where the identifying indicia is sensed within the boundaries of the geo-fence. Upon determining the presence of an attendee proximate to content creator 12, augmented reality device 56 may attempt to identify consumer 14, e.g., by facial recognition using one or more cameras 56c of augmented reality device 56 or by parsing any sensed identifying indicia. It should be noted that attendees to the real-world event may be issued some form of identifying indicia such as a coded near field communication (NFC) ID band or a band having a QR code associated with consumer 14, etc.

At operation 64, a determination may be obtained as to whether the one or more attendees whose identification information has been obtained corresponds to one or more subscribers to the content creator, a correspondence indicating that the one or more attendees are subscribers to the content creator. Augmented reality device 56 may transmit the identifying indicia or a copy of an image of consumer 14 captured by one or more cameras 56c to identification component 20 via network 32. Identification component engine 20a of identification component 20 may attempt to correlate the identifying indicia with one or more information elements indicative of a subscriber or content creator (e.g., to which a subscriber subscribes) stored within one or more of the databases or partitions of database 24. For example, an image of consumer 14 received by identification engine 20a from augmented reality device 56 may be compared to one or more images input by subscribers when registering with subscription platform 16. If a match can be made between the image received from augmented reality device 56 and one of which is stored in database 24, it may be determined that consumer 14 is a subscriber. From this information it may be determined to which content creator(s) consumer 14 subscribes. This determinative information may be sent to augmented reality device 56.

At operation 66, an augmented reality representation of the real-world event may be presented to the content creator, the augmented reality representations including one or more indicia identifying the one or more subscribers to the content creator, wherein prominence of the one or more indicia is based upon one or more aspects of subscribership information associated with each of the one or more subscribers. For example, if it is determined that consumer 14 subscribes to content creator 12 (whose corresponding geo-fence consumer 14 has entered), information may be obtained regarding consumer 14's subscribership to content creator 12, such as the subscription level at which consumer 14 subscribes, whether or not consumer 14 is entitled to some preferential access activity, etc. Identification engine 20a may execute an algorithm or access one or more lists or data structures correlating aspects of a subscriber's subscribership to one or more particular aspects of augmented reality identification indicia. Reporting engine 20b may transmit or forward one or more instructions for the manner in which consumer 14 is to be identified to, e.g., augmented reality component 56a of augmented reality device 56. Augmented reality component 56a may generate the one or more indicia to be presented in the augmented reality representation. For example, as illustrated in FIG. 7A, content creator 12 may, when looking through augmented reality device 26, which in this case may be embodied as a head-mounted display, see an augmented reality experience in which consumer 14 is identified with visual augmented reality elements, e.g., sparkles and a textual identifier, indicating that consumer 14 to content creator XYZ, which may be content creator 12.

In this way, content creator 12 can connect with his/her subscribers and increase or otherwise enhance subscribership, e.g., by interacting with his/her subscribers, by engaging in a preferential access activity, or other activity/engagement. The prominence of the augmented reality identification indicia presented with consumer 14 can vary depending on subscription level. For example, the prominence of the indicia can increase the higher the subscription level. At basic subscription levels, the augmented reality identification indicia may be commensurately basic, while at higher subscription levels, the augmented reality identification indicia may be commensurately high, e.g., more extravagant.

It should be noted that subscribership information associated with an attendee, e.g., consumer 14, is not necessarily limited to that regarding a particular content creator, e.g., content creator 12. For example, it may be useful for content creator 12 to know that consumer 14 subscribers to other content creators that may create similar content, and augmented reality identification indicia may reflect this information. For example, such knowledge may prompt content creator 12 to engage in collaborative content creation with another content creator. Such knowledge may make content creator 12 aware of another content creator on which content creator 12 may base or adjust his/her subscribership in the event the other content creator obtains greater revenue from his/her subscribers.

Such information may be presented along with the augmented reality identification information so that it may be readily appreciated by content creator 12. For example, copending U.S. application Ser. No. 15/432,788 and/or U.S. application Ser. No. 15/432,828 describe engagement and/or subscribership recommendations that can be provided to content creator 12. Such recommendations may be presented as or in conjunction with augmented reality identification information. For example, a recommendation that content creator 12 should engage a particular subscriber by replying to certain comments posted on content creator 12's webpage may be presented when that subscriber is proximate to content creator 12. This can be a more immediate and/or effective method of notifying or presenting a content creator with recommendations for increasing subscribership.

For example, upon a determination by augmented reality device 56 and identification component 20 of subscription platform 16 that a certain number of subscribers to a particular content creator other than content creator 12 is proximate to content creator 12, these subscribers may be identified to content creator 12 along with a recommendation to collaborate with the other content creator and/or approach these subscribers in an effort to gain them as subscribers. For example, this other content creator and content creator 12 may be identified as creating the same or a similar type(s) of content.

Information obtained as a result of content creator 12 becoming aware of a particular subscribers presence near him/her and/or at a live event may be transmitted back to subscription platform 16 and used to increase or enhance subscribership on behalf of consumer 14. For example, when identification component 20a obtains or attempts to obtain subscriber information associated with consumer 14, it may input information into, e.g., subscriber database 24c or subscribership database 24d, regarding virtual points or virtual currency. Virtual points or currency may be accumulated by consumer 14 and redeemed or applied towards promotional merchandise (which can be virtual or augmented reality merchandise) promoting content creator 12's content, towards gaining access to one or more preferential access activities, and/or towards some other activity involving or related to content creator 12.

Figure 6:
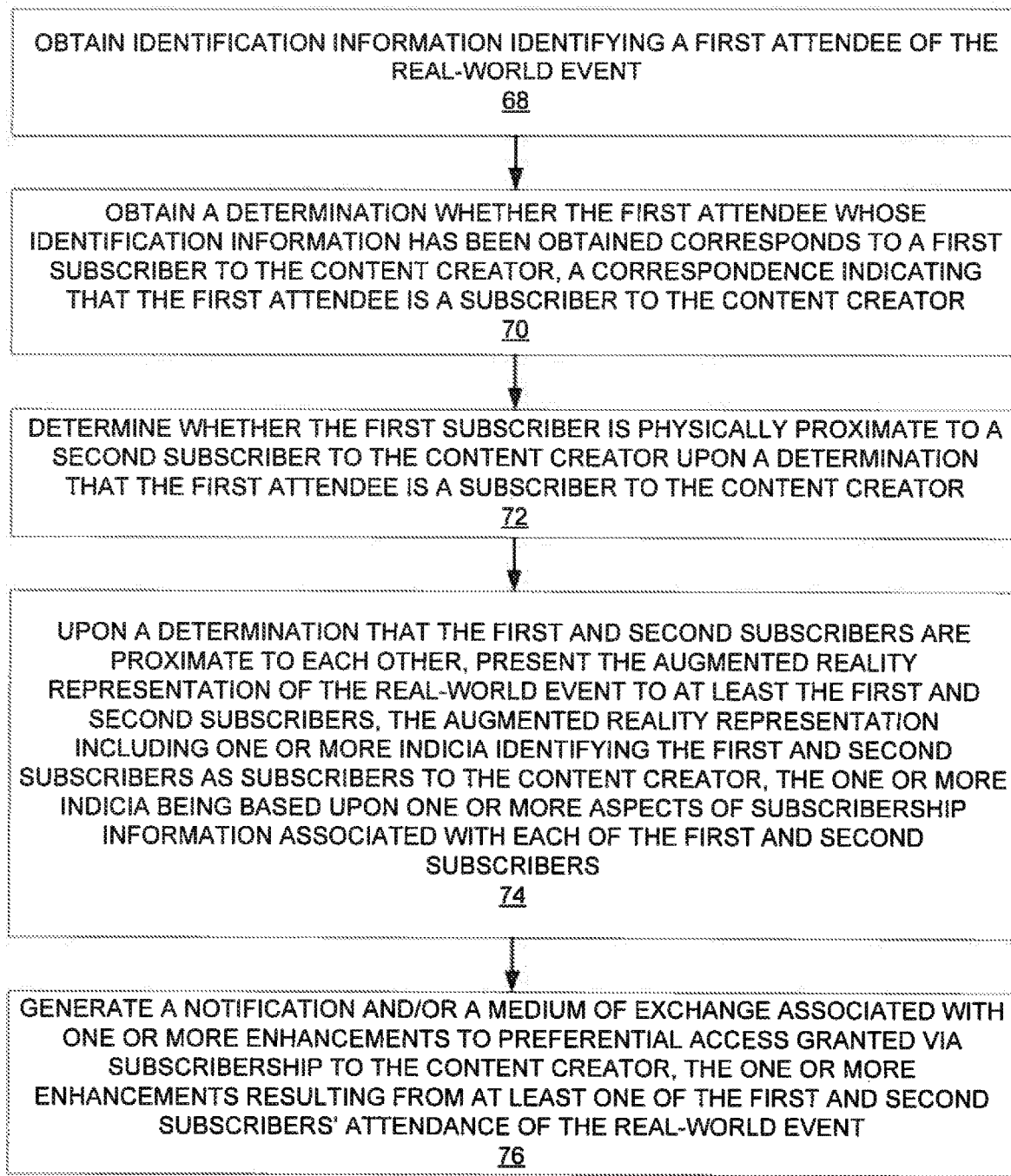
FIG. 6 is another example flow diagram illustrating example processes that may be performed to achieve augmented reality identification of live event attendees.

FIG. 6 is an example flow chart illustrating example operations that may be performed to achieve augmented reality identification between subscribers of one or more content creators. At operation 68, identification information of a first attendee of a real-world event may be obtained. As described above, identification information of an attendee may be obtained in a number of ways, some of which can include but are not limited to performing facial recognition, parsing information received from an identifying object or code associated with the first attendee, etc. At operation 70, a determination can be obtained regarding whether the first attendee whose identification information has been obtained corresponds to a first subscriber to a content creator, wherein a correspondence indicates that the first attendee is a subscriber to the content creator. As discussed previously, an augmented reality device operated by an attendee (such as augmented reality device 56 operated by consumer 14) to a live event may send obtained identification information to subscription platform 16, e.g., identification component 20 of subscription platform 16. Identification engine 20a of identification component 20 may attempt to correlate the obtained identification information with identification information associated with a subscriber to the content creator. Information regarding a correlation (or lack of correlation) can be transmitted to augmented reality component 56a from reporting engine 20b based on the result of the attempted correlation performed by identification engine 20a.

At operation 72, it can be determined whether the first subscriber is physically proximate to a second subscriber to the content creator upon a determination that the first attendee is a subscriber to the content creator. For example, and in the same or similar way that a geo-fence was previously described as being created about a content creator, a geo-fence can be specified about the first subscriber and/or other attendees of a live event. It should be noted that other methods of determining proximity can be utilized instead of or in addition to geo-fences. For example, contextual information regarding the presence of one or more attendees relative to other attendees may be sufficient to determine proximity. For example, respective location information can be gleaned from location services/location sensors operative in attendees' user devices. It should be noted that the second subscriber may have been previously identified as being a subscriber or may be identified substantially simultaneously with the identification of the first subscriber, or subsequent to the identification of the first subscriber.

At operation 74, upon a determination that the first and second subscribers are proximate to each other, the augmented reality representation of the real-world event may be presented to at least the first and second subscribers, the augmented reality representation including one or more indicia identifying the first and second subscribers as subscribers to the content creator, the one or more indicia being based upon one or more aspects of subscribership information associated with each of the first and second subscribers. Identification engine 20a of identification component 20 may obtain the relevant subscribership information, e.g., respective subscription levels of the first and second subscribers, other content creators to which the first and second subscribers subscribe, etc. Identification component 20a may, depending on the subscribership information obtained regarding the first and second subscribers, determine appropriate an augmented reality identification to be presented with each subscriber. Information, such as instructions regarding how or what to present regarding the augmented reality identification may be transmitted to reporting engine 20b, which can be transmitted to the augmented reality component of an augmented reality device being utilized by the first and second subscribers. It should be noted that in some embodiments, it is the augmented reality device of a first user viewing a second user that presents the augmented reality identification to the first user. In some embodiments, it may be the augmented reality device of the second user instructing the augmented reality device of the first user regarding how the second user is to be identified in an augmented reality experience. As described above, the manner in which augmented reality identifications may be presented can vary depending on the respective subscriptions levels of the first and second subscribers, whether or not the first and second subscribers have other content creator and/or content type subscriptions in common, etc.

Figure 7B:
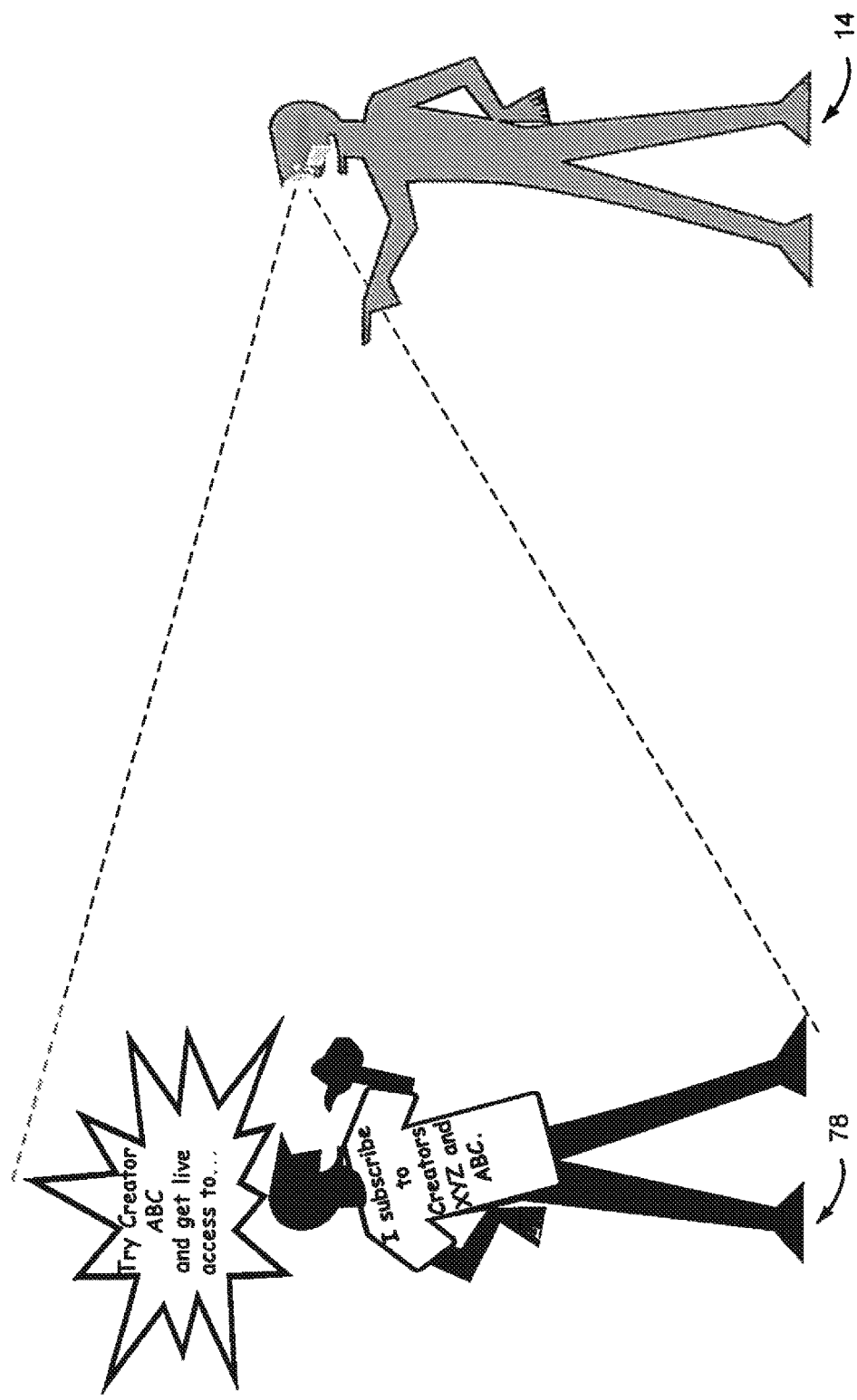

At operation 76, a notification and/or a medium of exchange associated with one or more enhancements to preferential access granted via subscribership to the content creator can be generated, the one or more enhancements resulting from at least one of the first and second subscribers' attendance of the real-world event. As previously discussed, information other than purely identification information may be presented. For example, information regarding a suggestion that the first and second subscribers engage in a collaborative subscription regarding one or more common creators can be generated and presented. For example, the recommendation may include a suggestion that the first and second subscribers pool monetary resources to obtain a higher subscription level with respect to one or more common (or suggested content creators), where the first and second subscribers can switch between engaging in preferential access activities with the one or more common or suggested content creators. For example, FIG. 7B illustrates an example scenario wherein upon determining that the first and second subscribers have commonality regarding a particular type of content or content creator, consumer 14 may, utilizing his/her augmented reality device, view augmented reality identification information of another subscriber 78, including a recommendation to subscribe to a content creator that subscriber 78 subscribes to in order to gain preferential access (e.g., live access to the content creator), where that content creator creates the same or similar content to which consumer 14 already subscribes.

It should be noted that although examples described herein are directed to identifying subscribers to content creators or other subscribers, augmented reality identification can be applied between content creators as well. For example, content creators at a live event, such as a content creator convention, may be identified to each other as, e.g., creating the same or similar types of content, residing in the same or nearby locale, etc.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An augmented reality identification system configured to identify a subscriber in an augmented reality representation of a real-world event regarding a content creator to which the subscriber subscribes, the system comprising:
   one or more physical processors configured by machine-readable instructions to:
      obtain identification information identifying a first attendee of the real-world event;
      obtain a determination whether the first attendee whose identification information has been obtained corresponds to that of a first subscriber to the content creator, a correspondence indicating that the first attendee is a subscriber to the content creator;
      determine whether the first subscriber is physically proximate to a second subscriber to the content creator upon a determination that the first attendee is a subscriber to the content creator;
      upon a determination that the first subscriber and the second subscriber are proximate to each other, present the augmented reality representation of the real-world event to at least the first subscriber and the second subscriber, the augmented reality representation including one or more indicia identifying the first subscriber and the second subscriber as subscribers to the content creator, the one or more indicia being based upon one or more aspects of subscribership information associated with each of the first subscriber and the second subscriber; and
      generate a notification and/or a medium of exchange associated with one or more enhancements to preferential access granted via subscribership to the content creator, the one or more enhancements resulting from at least one of the first subscriber's or the second subscriber's attendance of the real-world event.

2. The system of claim 1, wherein the determination whether the first attendee whose identification information has been obtained corresponds to that of the first subscriber to the content creator is obtained from a subscription platform through which the first subscriber subscribes to the content creator, one or more physical processors of the subscription platform being configured by machine-readable instructions to compare the identification information identifying the first attendee with identification information identifying one or more subscribers to at least one of the content creator to determine if a correlation exists therebetween.

3. The system of claim 1, wherein to determine whether the first subscriber is physically proximate to the second subscriber, the one or more physical processors are configured by machine-readable instructions to specify respective geo-fences surrounding at least one of the first subscriber and the second subscriber.

4. The system of claim 3, wherein to specify the respective geo-fences, the one or more physical processors are configured by machine-readable instructions to determine contextual information associated with a location of at least one of the first subscriber or the second subscriber, the location being at least one of a map-based location or a vision-based location.

5. The system of claim 3, wherein the determination that the first subscriber is physically proximate to the second subscriber is based upon the first subscriber entering a space within and defined by the second subscriber's respective geo-fence and/or the second subscriber entering a space within and defined by the first subscriber's respective geo-fence.

6. The system of claim 1, wherein the one or more aspects of the subscribership information comprise at least a subscription level associated with individual ones of the first subscriber and the second subscriber, the one or more physical processors being configured by machine-readable instructions to generate the one or more indicia to be representative of at least the respective subscription level associated with individual ones of the first subscriber and the second subscriber.

7. The system of claim 1, wherein the notification comprises a recommendation that the first subscriber and/or the second subscriber subscribe to another content creator to which the other of the first subscriber and/or the second subscriber subscribe.

8. The system of claim 1, wherein the notification comprises a recommendation that the first subscriber and the second subscriber engage in a collaborative subscription to the content creator.

9. The system of claim 1, wherein the one or more physical processors are further configured by machine readable instructions to transmit information indicative of a presence of the first subscriber and the second subscriber to a subscription platform through which the first subscriber and the second subscriber subscribe to the content creator.

10. The system of claim 9, wherein one or more physical processors of the subscription platform are configured by machine-readable instructions to translate the information indicative of the presence of the first subscriber and the second subscriber into a virtual medium of exchange redeemable by individual ones of the first subscriber and the second subscriber or a combination of the first subscriber and the second subscriber to be exchanged in the subscription platform for at least one of the preferential access to the content creator or promotional merchandise promoting the content creator.

11. A method to identify a subscriber in an augmented reality representation of a real-world event regarding a content creator to which the subscriber subscribes, the method comprising:
obtaining identification information identifying a first attendee of the real-world event;
determining whether the first attendee whose identification information has been obtained corresponds to that of a first subscriber to the content creator, a correspondence indicating that the first attendee is a subscriber to the content creator;
determining whether the first subscriber is physically proximate to a second subscriber to the content creator upon a determination that the first attendee is a subscriber to the content creator;
upon a determination that the first subscriber and the second subscriber are proximate to each other, presenting the augmented reality representation of the real-world event to at least the first subscriber and the second subscriber, the augmented reality representation including one or more indicia identifying the first subscriber and the second subscriber as subscribers to the content creator, the one or more indicia being based upon one or more aspects of subscribership information associated with each of the first subscriber and the second subscriber; and
generating a notification and/or a medium of exchange associated with one or more enhancements to preferential access granted via subscribership to the content creator, the one or more enhancements resulting from at least one of the first subscriber's or the second subscriber's attendance of the real-world event.

12. The method of claim 11, wherein the determining whether the first attendee whose identification information has been obtained corresponds to that of the first subscriber to the content creator is obtained from a subscription platform through which the first subscriber subscribes to the content creator, one or more physical processors of the subscription platform being configured by machine-readable instructions to compare the identification information identifying the first attendee with identification information identifying one or more subscribers to at least one of the content creator to determine if a correlation exists therebetween.

13. The method of claim 11, wherein the determining whether the first subscriber is physically proximate to the second subscriber, and the method further comprises specifying respective geo-fences surrounding at least one of the first subscriber and the second subscriber.

14. The method of claim 13, wherein to specify the respective geo-fences, the method further comprises determining contextual information associated with a location of at least one of the first subscriber or the second subscriber, the location being at least one of a map-based location or a vision-based location.

15. The method of claim 13, wherein the determination that the first subscriber is physically proximate to the second subscriber is based upon the first subscriber entering a space within and defined by the second subscriber's respective geo-fence and/or the second subscriber entering a space within and defined by the first subscriber's respective geofence.

16. The method of claim 11, wherein the one or more aspects of the subscribership information comprise at least a subscription level associated with individual ones of the first subscriber and the second subscriber, and wherein the method further comprises generating the one or more indicia to be representative of at least the respective subscription level associated with individual ones of the first subscriber and the second subscriber.

17. The method of claim 11, wherein the notification comprises a recommendation that the first subscriber and/or the second subscriber subscribe to another content creator to which the other of the first subscriber and/or the second subscriber subscribe.

18. The method of claim 11, wherein the notification comprises a recommendation that the first subscriber and the second subscriber engage in a collaborative subscription to the content creator.

19. The method of claim 11, wherein the method further comprises transmitting information indicative of a presence of the first subscriber and the second subscriber to a subscription platform through which the first subscriber and the second subscriber subscribe to the content creator.

20. The method of claim 19, wherein the method further comprises translating the information indicative of the presence of the first subscriber and the second subscriber into a virtual medium of exchange redeemable by individual ones of the first subscriber and the second subscriber or a combination of the first subscriber and the second subscriber to be exchanged in the subscription platform for at least one of the preferential access to the content creator or promotional merchandise promoting the content creator.

* * * * *